Jan. 7, 1936. O. WITTEL 2,027,007
FEELABLE FOOTAGE INDICATOR FOR MOTION PICTURE APPARATUS
Filed Oct. 7, 1933 2 Sheets-Sheet 1
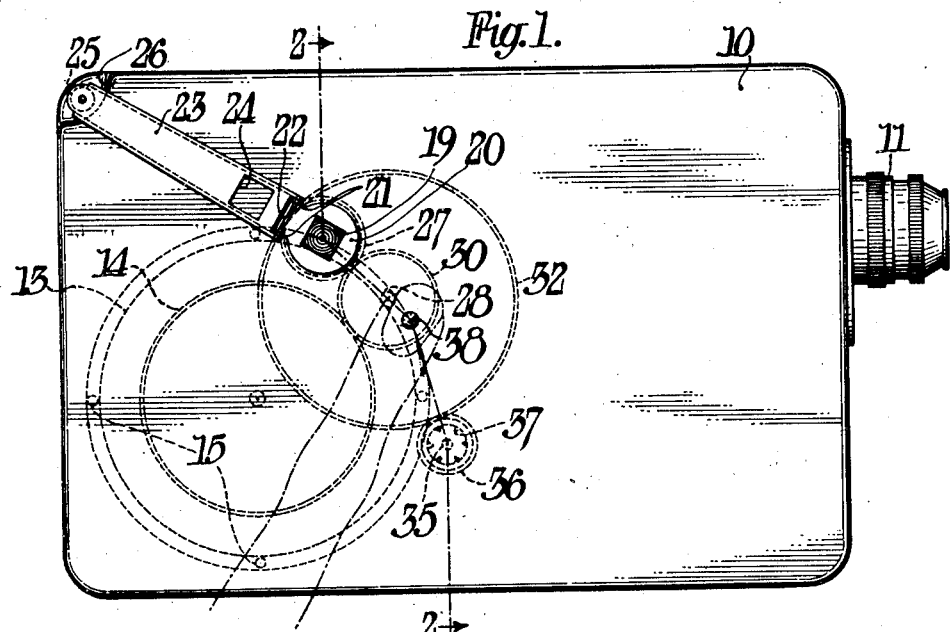
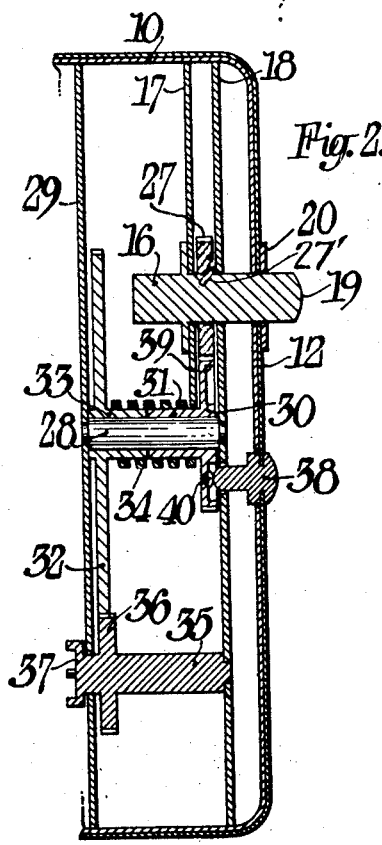
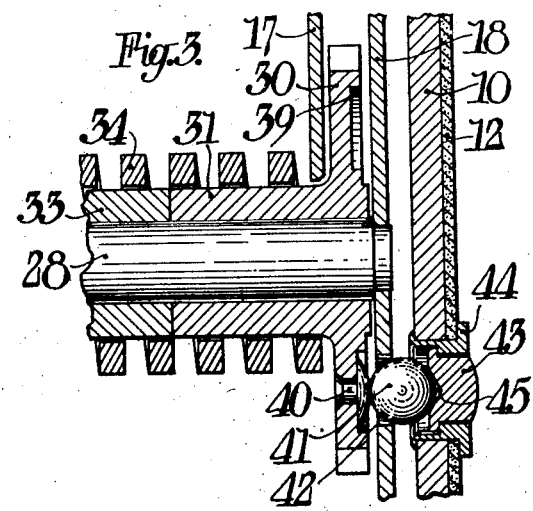
Inventor:
Otto Wittel,
By Newton M. ?????
George A. Gillette, Jr.
Attorneys Jan. 7, 1936. O. WITTEL 2,027,007

FEELABLE FOOTAGE INDICATOR FOR MOTION PICTURE APPARATUS

Filed Oct. 7, 1933 2 Sheets-Sheet 2

Inventor:
Otto Wittel,

By George A. Gillette, Jr.
Attorneys

Patented Jan. 7, 1936

2,027,007

UNITED STATES PATENT OFFICE 2,027,007

FEELABLE FOOTAGE INDICATOR FOR MOTION PICTURE APPARATUS

Otto Wittel, Rochester, N. Y., assignor to Eastman Kodak Company, Rochester, N. Y., a corporation of New York Application October 7, 1933, Serial No. 692,667

16 Claims. (Cl. 116—73)

The present invention relates to a footage indicator for a film handling apparatus and more particularly to a feelable indicator for a motion picture apparatus.

Various types of footage indicators are known to the prior art and such indicators may be classified either as visual or audible. The footage indicator of the present invention affects still another of the human senses, namely the sense of feeling.

The primary object of the present invention is the provision of a film footage indicator which is actuated by the driving means of the apparatus and which is adapted to create a feelable sensation. Another object of the present invention is the provision of a film footage indicator which is periodically pulsated by the driving means of an apparatus and which is available to affect the operator's sense of touch. A further object of the invention is the provision of a film footage indicator for a motion picture camera and which comprises a feelable member movably mounted on the camera and available to the touch of the operator and which is periodically moved by a protuberance on a rotatable member of the driving means, said protuberance being adapted directly or indirectly to actuate said feelable member.

The above and other objects of the invention are embodied in an indicator which comprises a feelable member movably mounted on the apparatus and available to the touch of the operator during normal operation of the apparatus and/or a means on a rotating member of the drive for the apparatus adapted periodically to engage the feelable member and pulsate the same in timed relation to the rate of film advancement through the apparatus. An anti-friction means may be provided for transmitting the impulses of the protuberance to the feelable member.

Reference is hereby made to the accompanying drawings in which similar reference numerals designate similar elements and in which:

Fig. 1 is a plan view of a motion picture camera equipped with one form of feelable indicator according to the invention.

Fig. 2 is a vertical cross-section through the camera of Fig. 1 and taken on the line 2—2 of Fig. 1.

Fig. 3 is a fragmentary cross-section of a modified and preferred form of the feelable indicator.

Figure 4:
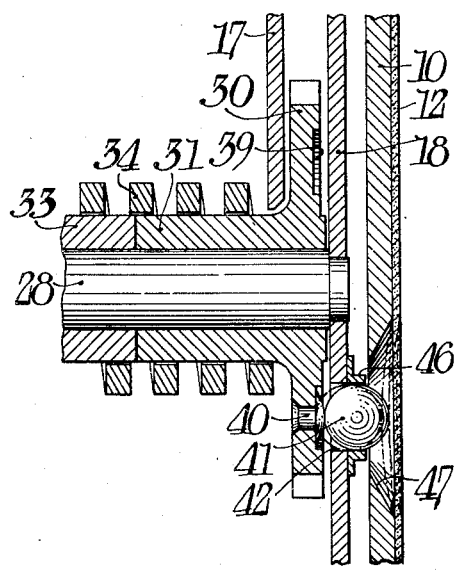
Fig. 4 is a fragmentary cross-section of a simplification of the preferred form of the invention.

Although the present invention is disclosed and illustrated with respect to a motion picture camera, it is understood that the invention may be applied with equal success to any type of film handling apparatus.

Any of the illustrated embodiments of the invention may be employed on a motion picture camera of the type shown and which includes a casing 10 carrying an objective 11. A flexible covering 12 is applied to the exterior of casing 10 and is preferably real or imitation leather. The power drive for the apparatus is the usual spring motor which includes a casing 13 and a gear 14. The casing 13 of the spring motor is positioned within the camera by means of a plurality of rivets 15.

The potential energy which is stored in the spring motor is provided by the operator and transmitted to the spring motor in the manner now to be described. Winding post 16 is rotatably mounted in the mechanism plates 17 and 18 within the camera and extends through the casing 10 and flexible cover 12 to the exterior of the camera. The protruding end of the winding post 16 is formed into a square nut 19 and a plate 20 is rotatably mounted with respect thereto. The plate 20 has a pair of ears 21 which pivotally support a pintle 22. A handle 23 is pivoted on pintle 22 and is provided with a square aperture 24 adapted to engage the square nut 19 in winding position of handle 23. When the handle is not in use it is swung into a position alongside of casing 10 with the knob 25 of handle 23 extending into a recess 26 provided in casing 10. A pinion gear 27 is mounted upon winding post 16 and is fastened to said post pin 16 by a pin 27'.

A spindle 28 is supported between mechanism plate 17 and a mechanism plate 29. A gear member is rotatably mounted on spindle 28 and includes a pinion gear 30 which meshes with pinion gear 27 and a sleeve 31, which is adapted to rotate upon spindle 28. The pinion gear 30 also meshes with the gear 14 of the spring motor, so that upon rotation of the winding post 16 by rotation of the handle 23 potential energy is stored in the spring motor.

A second gear member is rotatably mounted on spindle 28 and comprises a large pinion 32 and a sleeve 33. A coil spring 34, preferably of rectangular cross-section, encircles sleeves 31 and 33 for a purpose to be later described. A driving member includes a shaft 35 which is rotatably supported between mechanism plates 18 and 29, includes a pinion 36 which meshes with the large pinion 32, and includes a toothed disk 37 which is adapted to engage the film handling apparatus or film advancing mechanism.

The coil spring 34 functions in a known manner as a one-way clutch. During winding of the spring motor and rotation of the pinion gear 30, the coil spring 34 slides upon the sleeve 31 so that the large pinion 32 is not rotated during winding of the spring motor. However, when the spring motor is driving the apparatus, the pinion gear 30 then rotates in the opposite direction and coil spring 34 binds upon the periphery of sleeves 31 and 33 so that large pinion 32, pinion 36 and the toothed disk 37 are rotated to drive the apparatus.

The winding mechanism for the spring motor and the driving means for the film handling apparatus are of conventional design and constitute per se no part of the present invention. This construction has been discussed and described for the purpose of providing a setting or background for the invention and in order to demonstrate the cooperation of the feelable indicator with a rotatable member of the driving means.

The feelable member of the invention may be composed of a button 38 which is attached to the flexible covering 12 and which extends through openings in the casing 10 and mechanism plate 18 to the interior of the camera. Obviously the feelable member or button 38 is available to the touch of the operator during normal operation of the camera. The pinion gear 30 is provided with an annular recess 39 and a protuberance, such as rivet 40, is located on pinion gear 30 within annular recess 39. Upon operation of the camera the pinion gear 30 rotates and the protuberance or rivet 40 engages the end of button 38 periodically to pulsate the same. Since each rotation of the pinion gear 30 bears a definite timed relation to the rate of film advancement through the apparatus, each impulse imparted by the protuberance to the feelable member also bears a definitely timed relation to such rate of film advancement. Consequently, if the finger of the operator is held on the feelable member, as indicated in dotted lines in Figure 1, the impulses received from the protuberance on the rotatable member of the driving means, such as rivet 40 on pinion gear 30, will be felt by the operator. In actual practice, the timing of the driving means is such that pinion gear 30 rotates twice for each foot of film advancement, therefore, each pulsation of the feelable member indicates that a half a foot has passed through the apparatus.

It is conceivable that the operator may press so hard upon the button 38 as to bear against pinion gear 30 or rivet 40 and stop the apparatus. Therefore, it is preferred to insert an anti-friction means between the rotatable member of the driving means and the feelable member. Such an anti-friction means may comprise a ball bearing 41, see Fig. 3, which is loosely supported within an opening 42 provided in mechanism plate 18. In this modification the button 43 is slidably mounted in a bushing 44 and is provided with a recess 45 for better engagement with the ball bearing 41. The annular recess 39 may form a ball race for ball bearing 41 to assist in retaining it in position between the rivet 40 and button 43.

It may be observed that pinion gear 30 will be rotated during winding of the spring motor so that the feelable member is also pulsated at this time. This fact renders it possible for the operator to keep track of the winding operation.

Extension of the feelable member through or beyond the camera casing may be eliminated so that the camera will have a smooth and even exterior in the vicinity of the feelable indicator. As illustrated in Fig. 4, the ball bearing 41 is loosely supported by a bushing 46 which is attached to mechanism plate 18. The camera casing 10 is provided with a counter-sunk hole 47 which is completely covered by the flexible covering 12. The pressure exerted by the finger of the operator will depress that portion of flexible covering 12 which is over counter-sunk hole 47 in the manner indicated by the dotted lines in Fig. 4. The impulses imparted to ball bearing 41 are now available to the touch of the operator through the covering 12 and the exterior of the camera is smooth and without any protruding parts.

Figure 5:
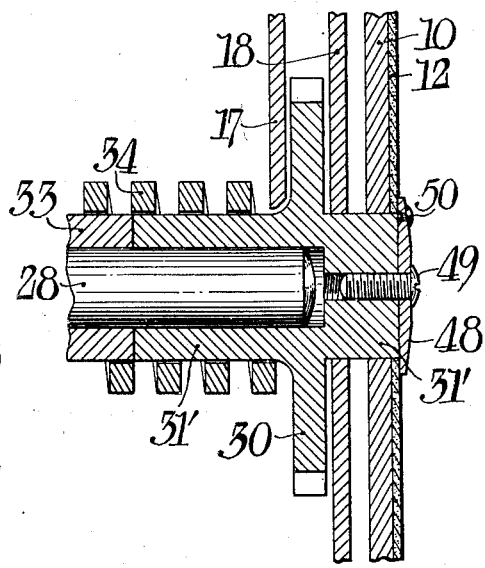
Fig. 5 is a fragmentary cross-section of the simplest form of the invention.

The simplest form of the invention is the eccentric location of the feelable member on a rotating member which extends to the exterior of the camera in several of the commercial types of motion picture cameras. Such a rotating member is exemplified by the disc 48 of Fig. 5. The sleeve 31' which supports pinion gear 30 extends through mechanism plate 18, casing 10 and covering 12. The disc 48 is fastened to the end of sleeve 31' by a bolt 49 and the feelable member is eccentrically located on this exposed rotating member of the camera. The feelable member may be composed of a protuberance 50 which is riveted to disc 48 adjacent the rim thereof.

Figure 6:
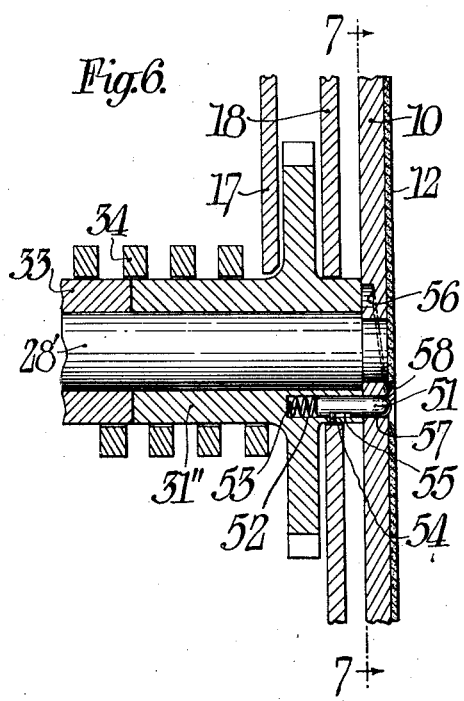
Fig. 6 is a fragmentary cross-section of still another modification of the invention.
Figure 7:
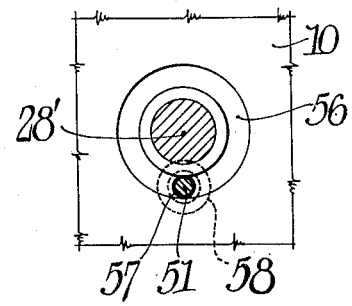
Fig. 7 is a fragmentary cross-section taken on the line 7—7 of Fig. 6.

A further modification of the invention is illustrated in Figs. 6 and 7. The spindle 28' has a bearing in casing 10 and supports the sleeve 31" with one end adjacent the casing 10. The feelable member in this instance is composed of a pin 51 which has a rounded head, which is slidably mounted in a bore 52 in the end of sleeve 31", and which is urged outwardly by a spring 53. A pin 54 on sleeve 31" extends into a slot 55 provided in pin 51 to form a pin and slot connection for limiting the movement of pin 51. A circular groove 56 is provided in casing 10 and in the path of pin 51. A hole 57 is provided in casing 10 and in groove 56 while a corresponding opening 58 may be provided in the flexible covering 12. The groove 56 slopes or tapers toward hole 57 so that pin 51 may be available to the touch of the operator through hole 57 and opening 58 but be carried back into bore 52 upon further rotation of sleeve 31" to carry pin 51 past hole 57.

The several modifications that have been illustrated indicate the susceptibility of the invention to adaptation and alteration. Consequently, the various forms of the invention here disclosed are to be considered as illustrative, the appended claims defining the scope of the invention.

What I claim as my invention and desire to be secured by Letters Patent of the United States is:

1. In a film handling apparatus, the combination with a driving means for advancing film through said apparatus at any desired rate, of a feelable member actuated by said driving means and located normally to be available to the sense of feeling of the operator.

2. In a film handling apparatus, the combination with a driving means for advancing film through said apparatus at a predetermined rate and including a rotatable member, of a feelable member moved by the rotatable member of said driving means arranged to be accessible to the sense of feeling of the operator during normal operation of said apparatus, and moved by said rotatable member at a rate corresponding to the rate of film advancement.

3. In a film handling apparatus, the combination with a driving means for advancing film through said apparatus at a predetermined rate, of a feelable member pulsated by said driving means in timed relation to the rate of film advancement and positioned for imparting sensations to the sense of feeling of the operator.

4. In a film handling apparatus, the combination with a casing for said apparatus, and a driving means for advancing film through said casing, of a feelable member movably mounted with respect to said casing in a position available to the touch of the operator during normal operation of the apparatus and actuated by said driving means periodically to affect the operator's sense of feeling in timed relation to the rate of film advancement.

5. In a film handling apparatus, the combination with a casing for said apparatus, and a driving means for advancing film through said casing and including a rotatable member, of a protuberance eccentrically located on said rotatable member and positioned for periodically imparting a feelable sensation to the operator.

6. In a motion picture apparatus, the combination with a casing for said apparatus, and a driving means for advancing film through said apparatus and including a rotatable member, of a feelable member movably mounted with respect to said casing and extending to the exterior of said casing, and a protuberance on said rotatable member for imparting an impulse to said feelable member upon each rotation of said rotatable member.

7. In a motion picture apparatus, the combination with a casing for said apparatus, and a driving means for advancing film through said apparatus and including a rotatable member, of a feelable member movably mounted with respect to said casing in a position available to the touch of the operator during normal operation of the apparatus, a protuberance on said rotatable member, and a means movably mounted and arranged for movement by said protuberance and for movement of said feelable member.

8. In a motion picture apparatus, the combination with a casing for said apparatus, and a driving means for advancing film through said apparatus and including a rotatable member, of a feelable member movably mounted with respect to said casing in a position available to the touch of the operator during normal operation of the apparatus, a protuberance on said rotatable member, and an anti-friction means movably mounted between said rotatable member and said feelable member and arranged for movement by said protuberance and for movement of said feelable member.

9. In a motion picture apparatus, the combination with a casing for said apparatus, a mechanism plate within said casing and provided with an opening, and a driving means for advancing film through said apparatus and including a rotatable member, of a feelable member movably mounted with respect to said casing and in a position available to the touch of the operator during normal operation of the apparatus, a protuberance on said rotatable member, and an anti-friction means loosely supported within the opening of said mechanism plate and arranged for movement by said protuberance and for movement of said feelable member.

10. In a motion picture apparatus, the combination with a casing for said apparatus, a mechanism plate within said casing and provided with an opening, and a driving means for advancing film through said apparatus and including a rotatable member, of a feelable member movably mounted with respect to said casing and in a position available to the touch of the operator during normal operation of the apparatus, a protuberance on said rotatable member, and a ball bearing loosely supported within the opening of said mechanism plate and arranged for movement by said protuberance and for movement of said feelable member.

11. In a motion picture apparatus, the combination with a casing for said apparatus, a mechanism plate within said casing and provided with an opening, and a driving means for advancing film through said apparatus and including a rotatable member, which is provided with an annular groove, of a button slidably mounted on said casing and extending to the exterior thereof, a protuberance within said groove on said rotatable member, and a ball bearing loosely supported within the opening of said mechanism plate and within the groove of said rotatable member and for engaging both said button and said protuberance and arranged for movement by said protuberance and for movement of said button.

12. In a motion picture apparatus, the combination with a casing for said apparatus, and a driving means for advancing film through said apparatus and including a rotatable member which is provided with a groove, of a feelable member movably mounted with respect to said casing and in a position available to the touch of the operator during normal operation of the apparatus, and a protuberance on said rotatable member within said groove and for actuating said feelable member to pulsate the same in timed relation to the rate of film advancement.

13. In a motion picture apparatus, the combination with a casing for said apparatus, and a driving means for advancing film through said apparatus and including a rotatable member which is provided with a groove, of a feelable member movably mounted with respect to said casing and in a position available to the touch of the operator during normal operation of the apparatus, a protuberance on said rotatable member within said groove, and a ball bearing movably mounted between said rotatable member and said feelable member and adapted partially to enter the groove of said rotatable member for guidance thereby and for contact with said protuberance.

14. In a motion picture apparatus, the combination with a casing for said apparatus and which is provided with an aperture, a protective covering of flexible material for said casing, and a driving means for advancing film through said apparatus and including a rotatable member, of a feelable member supported by said covering within said aperture, and a protuberance on said rotatable member and for actuating said feelable member to pulsate the same in timed relation to the rate of film advancement.

15. In a motion picture apparatus, the combination with a casing for said apparatus and which is provided with an aperture, a protective covering of flexible material for said casing, and a driving means for advancing film through said apparatus and including a rotatable member, of a feelable member supported by said covering within said aperture, and extending to the exterior of the apparatus, and a protuberance on said rotatable member and for directly and periodically engaging said feelable member to pulsate the same in timed relation to the rate of film advancement.

16. In a film handling apparatus, the combination with casing for said apparatus and which is provided with an aperture, a protective covering of flexible material for said casing and extending over said aperture, and a driving means for advancing film through said apparatus and including a rotatable member, of a feelable member adjacent the aperture in said casing and available to the touch of the operator through said covering, and a protuberance on said rotatable member and for periodically engaging said flexible member to pulsate the same in timed relation to the rate of film advancement.

OTTO WITTEL.